(12) United States Patent
Renteria

(10) Patent No.: US 11,634,211 B2
(45) Date of Patent: Apr. 25, 2023

(54) AIRCRAFT WITH LINEAR THRUSTER ARRANGEMENT

(71) Applicant: Joseph R. Renteria, Beaumont, CA (US)

(72) Inventor: Joseph R. Renteria, Beaumont, CA (US)

(*) Notice: Subject to any disclaimer, the term of this patent is extended or adjusted under 35 U.S.C. 154(b) by 352 days.

(21) Appl. No.: 17/134,821

(22) Filed: Dec. 28, 2020

(65) Prior Publication Data

US 2021/0114724 A1 Apr. 22, 2021

Related U.S. Application Data

(63) Continuation-in-part of application No. 15/861,479, filed on Jan. 3, 2018, now abandoned.

(60) Provisional application No. 62/516,361, filed on Jun. 7, 2017.

(51) Int. Cl.
| | |
|---|---|
| *B64C 15/02* | (2006.01) |
| *B64C 27/08* | (2023.01) |
| *B64C 39/02* | (2023.01) |
| *B64U 10/10* | (2023.01) |
| *B64U 30/20* | (2023.01) |

(52) U.S. Cl.
CPC ............. *B64C 15/02* (2013.01); *B64C 27/08* (2013.01); *B64C 39/024* (2013.01); *B64U 10/10* (2023.01); *B64U 30/20* (2023.01)

(58) Field of Classification Search
CPC ......... B64C 27/10; B64C 27/20; B64C 27/16; B64C 11/46; B64C 11/48; B64C 29/0016; B64C 29/0025; B64C 29/0041; B64C 29/005; B64C 2201/024; B64C 2201/027; B64C 2201/108; B64U 30/20; B64U 10/13

See application file for complete search history.

(56) References Cited

U.S. PATENT DOCUMENTS

| | | | | |
|---|---|---|---|---|
| 8,485,464 | B2 * | 7/2013 | Kroo ....................... | B64C 3/16 |
| | | | | 244/6 |
| 8,733,690 | B2 * | 5/2014 | Bevirt ................. | B64C 29/0033 |
| | | | | 244/17.23 |
| 9,938,005 | B2 * | 4/2018 | Matus ................... | B64C 39/024 |
| 10,046,853 | B2 * | 8/2018 | Vander Mey .......... | B64C 27/08 |
| 10,737,766 | B2 * | 8/2020 | Mores ................... | B64C 11/46 |
| 10,933,987 | B2 * | 3/2021 | Zhang .................... | B64C 27/28 |
| 11,052,998 | B2 * | 7/2021 | Mores ................... | B64D 27/24 |
| 2015/0012154 | A1 * | 1/2015 | Senkel ................. | B64C 27/473 |
| | | | | 701/4 |
| 2017/0183081 | A1 * | 6/2017 | Du ........................ | B64C 27/10 |

* cited by examiner

*Primary Examiner* — Richard Green
*Assistant Examiner* — Arfan Y. Sinaki
(74) *Attorney, Agent, or Firm* — Olav M. Underdal; IDP Patent Services

(57) ABSTRACT

A linear thruster aircraft includes: an airframe, including an elongated mounting nacelle and a main body; an aircraft control unit with a processor, a non-transitory memory, and an input/output component; and at least one linear thruster arrangement with at least four thrusters mounted along at least one elongated axis of the elongated mounting nacelle, such that the thrusters are configured to provide lift, pitch, roll, and yaw movement. Optionally, the linear thruster arrangement can include alternating lateral and vertical offsets of the thrusters from the elongated axis, and pairs of thrusters can be vertically overlapping.

21 Claims, 12 Drawing Sheets

Linear Thruster Aircraft

Linear Thruster Aircraft

Linear Thruster Aircraft

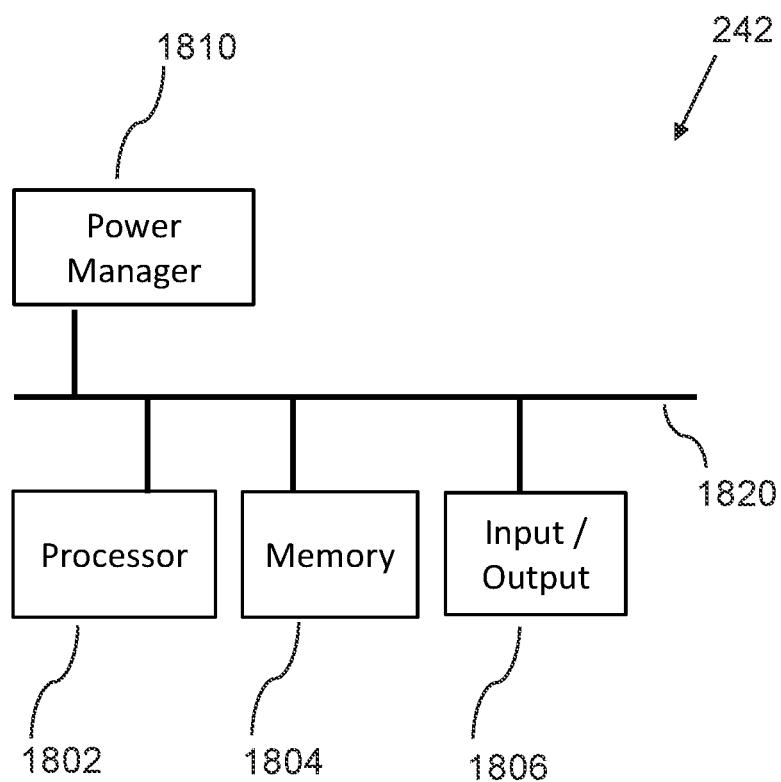

AIRCRAFT WITH LINEAR THRUSTER ARRANGEMENT

CROSS-REFERENCE TO RELATED APPLICATIONS

This application is a Continuation-In-Part of U.S. Non-Provisional application Ser. No. 15/861,479, filed Jan. 3, 2018, which claims the benefit of U.S. Provisional Application No. 62/516,361, filed Jun. 7, 2017; both of which are hereby incorporated herein by reference in their entirety.

FIELD OF THE INVENTION

The present invention relates generally to the field of aircraft thruster designs, and more particularly to methods and systems for arranging thrusters in a linear array.

BACKGROUND OF THE INVENTION

In the world of aviation there are many different types of vertical take-off and landing (VTOL) systems, which provide a useful means of lifting personnel and payloads to perform various tasks. There have been many attempts at designing such systems in ways that maximize their portability and versatility by minimizing the footprint of the system. Unfortunately, these attempts always compromise on efficiency, stability, simplicity or make compromises on the original objective of having a small form factor. Usually such designs are complex and generally unsuccessful.

Helicopters are typically large and ungainly, with exposed rotors prevent them from being used in many applications, and are generally associated with very high maintenance costs. Small ducted fans are very inefficient in generating static thrust for lift, and provide poor stability when confined to a small footprint. Related industries have shown interest in small and compact vertical lift systems which are stable and safe to be around, but attempts to implement such designs have failed in the market.

As such, considering the foregoing, it may be appreciated that there continues to be a need for novel and improved devices and methods for vertical take-off and landing systems and devices.

SUMMARY OF THE INVENTION

The foregoing needs are met, to a great extent, by the present invention, wherein in aspects of this invention, enhancements are provided to the existing models for vertical take-off and landing aircraft.

In an aspect, a linear thruster aircraft can include:
a) at least one linear thruster arrangement, including:
   a first thruster;
   a second thruster;
   a third thruster; and
   a fourth thruster; and
b) an airframe, which can include an elongated mounting nacelle;
wherein each thruster of the at least one linear thruster arrangement can be connected to the to the elongated mounting nacelle at least substantially along an elongated axis of the elongated mounting nacelle;
wherein a center of thrust forces of the at least one linear thruster arrangement can be vertically displaced from a center of mass of the linear thruster aircraft;
wherein the first and second thrusters are positioned on a first side of the center of mass of the linear thruster aircraft;
wherein the third and fourth thrusters are positioned on a second side of the center of mass of the linear thruster aircraft.

In a related aspect, the linear thruster aircraft can be configured such that:
a) the first and second thrusters include at least one thruster configured to provide a first sideward downward thrust with respect to the elongated axis and at least one thruster configured to provide a second sideward downward thrust with respect to the elongated axis; and
b) the third and second thrusters include at least one thruster configured to provide a first sideward downward thrust with respect to the elongated axis and at least one thruster configured to provide a second sideward downward thrust with respect to the elongated axis;
such that the at least one linear thruster arrangement is configured to provide lift, pitch, roll, and yaw for the linear thruster aircraft by independently controlling a differential thrust for each of the first, second, third, and fourth thrusters.

In yet a related aspect, each thruster of the first linear thruster arrangement can be positioned along a longitudinal axis of the airframe.

In another related aspect, each thruster of the first linear thruster arrangement can be positioned along a lateral axis of the airframe.

In yet another related aspect, each thruster of the first linear thruster arrangement can be a rotor.

In a related aspect, the first linear thruster arrangement can be positioned above a center of mass of the linear thruster aircraft, such that the first linear thruster arrangement lifts the linear thruster aircraft from a top of the linear thruster aircraft.

In a related aspect, the first linear thruster arrangement can be positioned below a center of mass of the linear thruster aircraft, such that the linear thruster arrangement lifts the linear thruster aircraft from a bottom of the linear thruster aircraft.

In a related aspect, the linear thruster aircraft can further include a plurality of rotor shrouds, wherein each thruster of the first linear thruster arrangement is configured to spin inside a rotor shroud.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a schematic diagram illustrating an aircraft control unit, according to an embodiment of the invention.

DETAILED DESCRIPTION

Figure 1A:
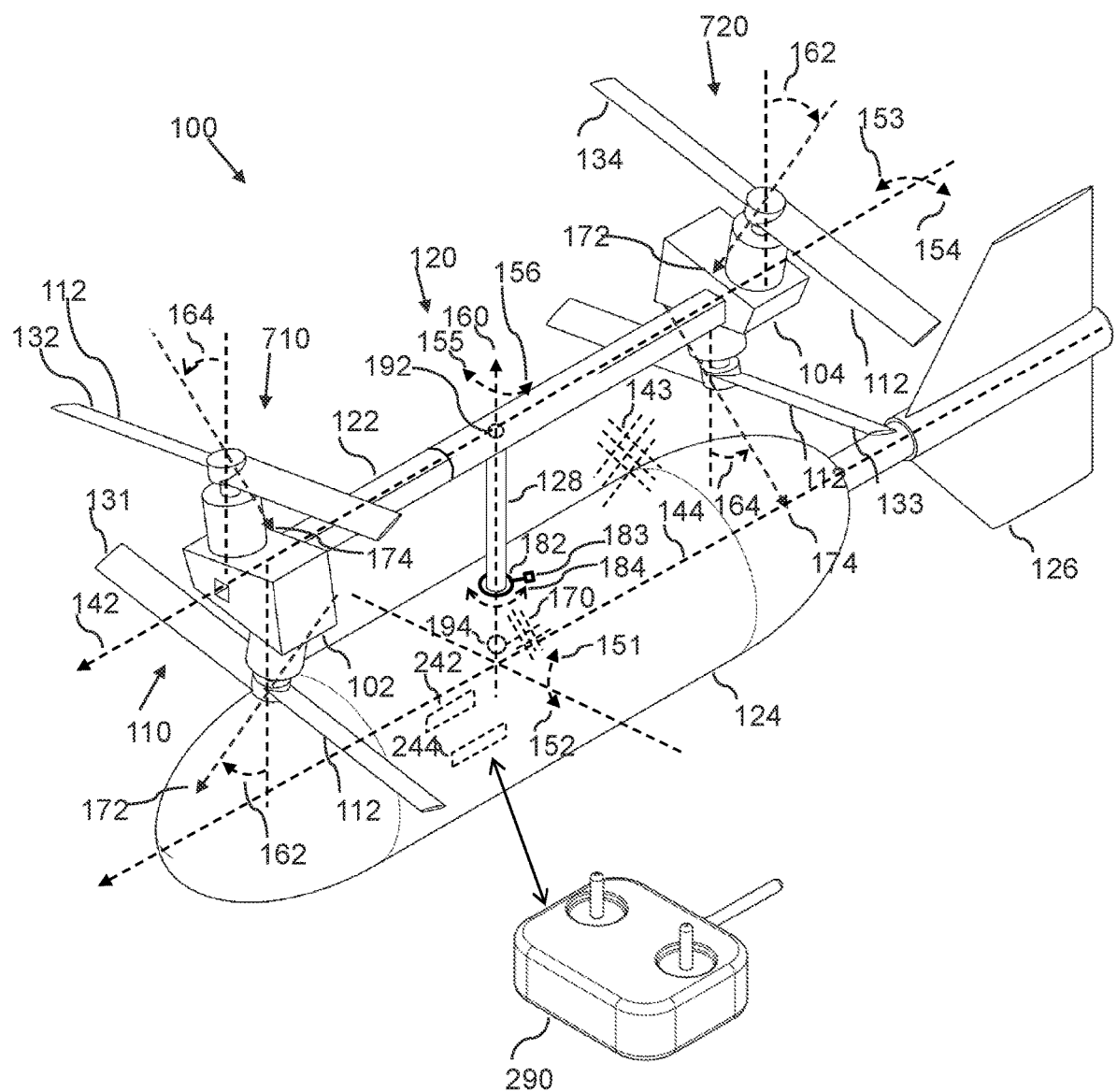
FIG. 1A is a perspective view of a linear thruster aircraft, according to an embodiment of the invention, shown oriented in a flight mode with a linear thruster arrangement longitudinally positioned above a center of mass of the linear thruster aircraft.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a linear thruster aircraft 100 with reference to FIGS. 1A, 1B, and 1C, in such manner that like reference numerals refer to like components throughout; a convention that we shall employ for the remainder of this specification.

In related embodiments, a linear thruster aircraft 100 includes a linear thruster arrangement 110, which is able to provide lift to an aircraft 100, while also providing pitch, roll and yaw stability. The linear thruster arrangement 110 is advantageous in that it can be configured to have an absolute minimal width or length because it allows the thrusters to be arranged in a longitudinal or lateral fashion.

In various embodiments, a linear thruster aircraft 100, which can also be referred to as a linear thruster vehicle 100, can include all types of flying devices 100, including airplanes 100, and remote-controlled drones 100, but in some embodiments can include other types of vehicles 100, that may benefit from a linear thruster arrangement 110, such as for example remote-controlled power boats 100, cars 100, submersibles 100, such as a drone submarine with inline rotors along the top, etc. Various other embodiments can include flying devices that may benefit from having a linear thruster arrangement 110, such as novelty flying devices, including flying fish, arrows, hoverboards and other unique configurations.

In various embodiments, the linear thruster arrangement 110 can include a plurality of thrusters 112 that can be arranged along the longitudinal 142 or lateral axis 344 of an aircraft 100, as shown in FIGS. 1A, 1D, 1E, and 1F respectively. The thrusters 112 can be arranged in a longitudinal configuration, and so have a longitudinal axis along which the thruster configuration 110 runs, and which the thruster configuration 110 and connected airframe 120 must be stabilized around. The thrusters 112 provide lift to the aircraft 100 and are located above and/or below the center of mass of the aircraft 100. Some of the thrusters 112 may be mounted at angles or use deflecting surfaces to produce some amount of lateral and/or longitudinal force. This allows the thrusters 112 to rotate the aircraft 100 around a lateral or longitudinal axis 142 and the center of mass 194, allowing a flight control system to provide pitch, roll and yaw stability.

Figure 3A:
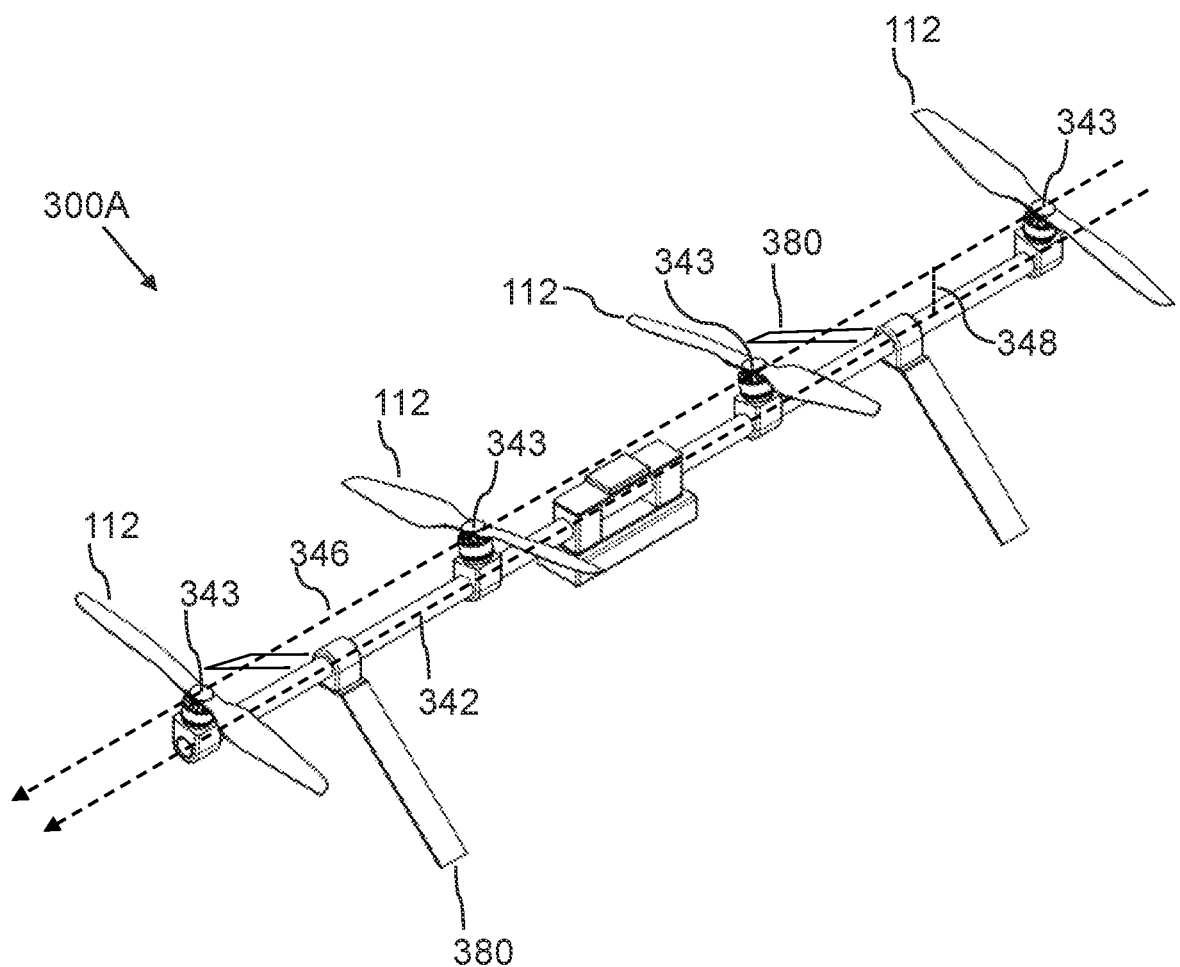
FIG. 3A is a perspective view of a linear thruster aircraft, according to an embodiment of the invention.

In related embodiments, as shown in FIG. 3A, the linear thruster aircraft 100 can be configured with landing gear 380, landing legs 380, or other type of devices 380 to allow the aircraft 100 to be stably landed or stably positioned on a ground surface.

In related embodiments, the thrusters 112 can be turbines, propellers, or rotors, including pairs of intermeshing rotors, or other forms of propulsion mechanisms that generates thrust.

In a further related embodiment, intermeshing rotors can be co rotating or counter rotating. Intermeshed timing can be electronically controlled by computer and/or mechanically controlled by gears or universal joints. Differential thrust of intermeshing rotors can be achieved by use of variable pitch rotors.

In related embodiments, the thrusters 112 may be powered by electric power, such that each thruster 112 includes an electric engine, which receives electric power from at least one electric power source, such as a battery. However, in alternative embodiments, mechanical power may be transferred to each thruster 112, via axles, chain, or belt mechanical transfer, from at least one engine, such as an electrical or combustion engine.

Figure 4A:
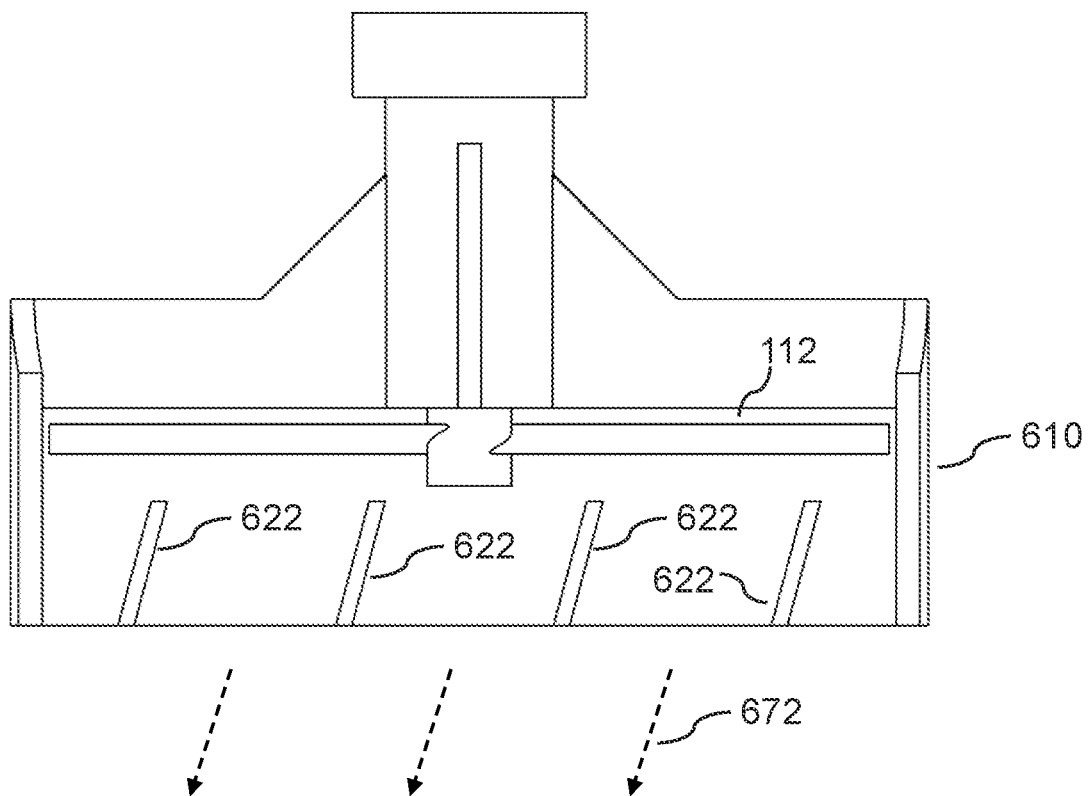
FIG. 4A is a front view of a thruster with rightward oriented control vanes, according to an embodiment of the invention.
Figure 4B:
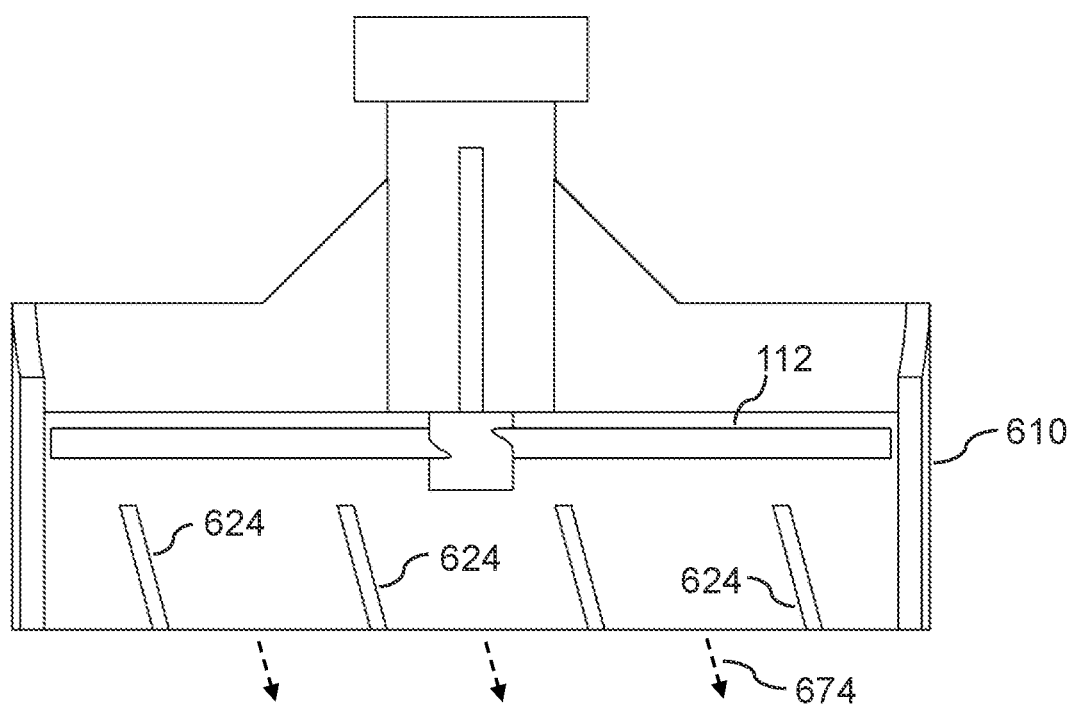
FIG. 4B is a front view of a thruster with leftward oriented control vanes, according to an embodiment of the invention.

In related embodiments, some or all thrusters 112 can create an amount of lateral force so as to stabilize the aircraft 100 around the longitudinal thruster configuration axis 142. This can be achieved by mounting thrusters 112 at angles, by deflecting an airstream created by the thrusters 112 with surfaces, or by other methods and devices. Thrusters 112 and/or deflection surfaces 622, 624, as shown in FIGS. 4A and 4B, may be actively positioned to augment, enhance or fine tune control of aircrafts 100.

In some embodiments, it may be desirable to control or augment the control of yaw maneuvers with active control vanes 622, 624. One such case is that where the thrusters 112 are spinning rotors and an uneven number of rotors are used, such as for example three rotors. By using active control vanes, a designer is free to decouple rotor torque from the yaw stability of the aircraft 100.

Figure 1B:
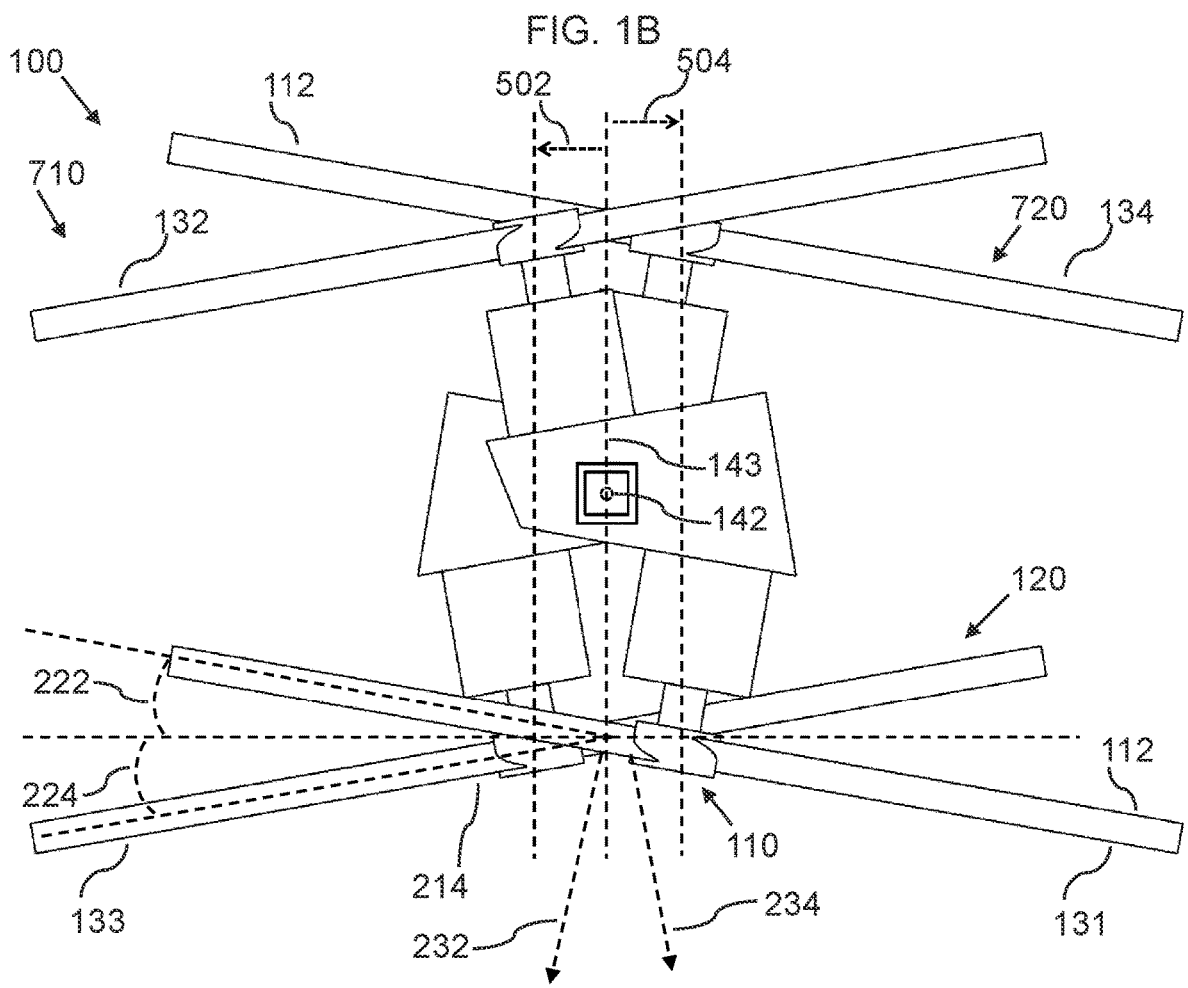
FIG. 1B is a front view of portions of the embodiment of the linear thruster aircraft shown in FIG. 1A.
Figure 1C:
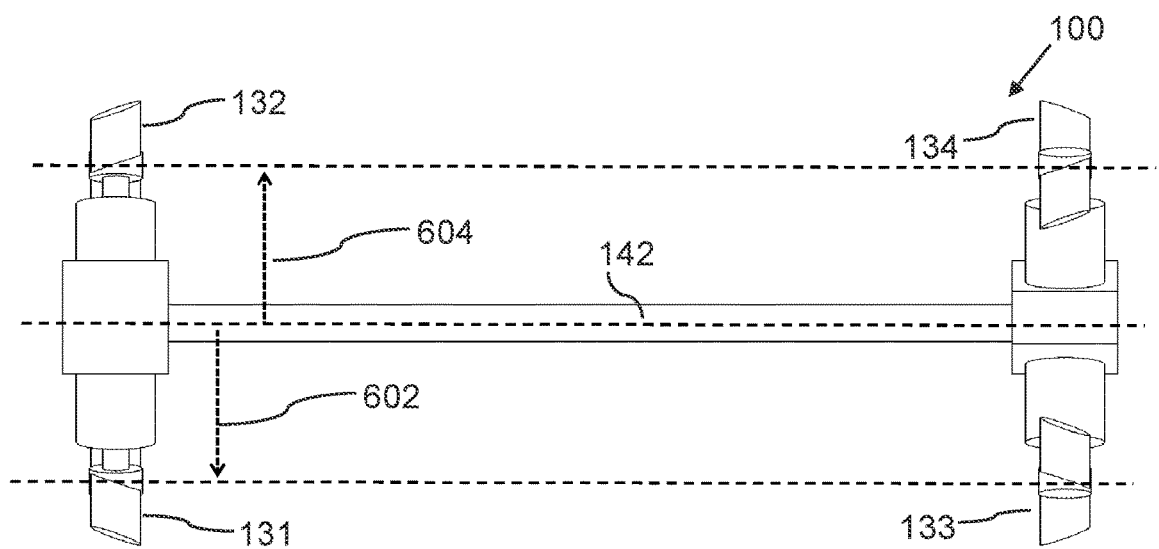
FIG. 1C is a side view of portions of the linear thruster aircraft shown in FIG. 1A.

In some related embodiments, as shown in FIGS. 1A, 1B, and 1C, while the goal is to mount the thrusters 112 in a completely linear configuration, in order to produce the most compact aircraft 100 possible, it may also be desirable to configure the thrusters 112 in a substantially linear configuration, with a lateral offset 502, 504 of the thrusters from a vertical plane 143 of the elongated axis 142 of the thruster configuration 110, which can add stability as well as allow a more compact longitudinal dimension. The lateral offset 502 504, can be a right-side lateral offset 502 or a left side lateral offset 504, such that the thrusters 112 can be configured with alternating right and left side lateral offsets 502, 504. Such a configuration allows the aircraft 100 to have some added stability based on the lateral distance between thrusters 112, similar to a conventional multirotor.

In other related embodiments, some or all of the thrusters 112 may be pivotally mounted, allowing an angle of the thruster 112 to be actively or manually adjusted. Thrusters 112 may be rotors, where the angle of the thruster 112 allows the thruster 112 to provide yaw control to the aircraft and the rotor torque assists the thrust vector in yaw control.

In related embodiments, the purpose of the thrusters 112 being able to produce lateral forces is to allow the thrusters 112 to rotate an aircraft around the roll or pitch axis, depending on how the aircraft 100 is configured in relation to the thruster arrangement 110. This way, the thrusters 112 are able to provide stability to an aircraft 100 by rotating the aircraft 100, and the collective lifting thrust vector of the aircraft around an axis. Most multi-thruster aircrafts such as multi-rotors stabilize themselves by rotating the aircraft around multiple axis by producing varied vertical forces for different sections of the aircraft. While the various embodiments of the linear thruster aircraft 100 may also do this to some extent, a main stabilizing factor for the thruster configuration 110 around the longitudinal axis 142 is the lateral movements produced, which then rotate the aircraft 100 around the longitudinal axis 142.

In related embodiments, to lift an aircraft 100, power is supplied to the thrusters 112. Differential thrust levels between the thrusters 112 then provides roll, pitch and yaw control. Thrusters 112 may have redundancy, allowing continued use and control of an aircraft even after one or more thrusters have failed. Increased differential thrust applied to a first plurality of thrusters 112, shall be understood to mean that relatively more thrust/power is applied to the first plurality of thrusters 112, relative to a second plurality of thrusters 112. Increased differential thrust applied to a first thruster 112, shall be understood to mean that relatively more thrust/power is applied to the first thruster 112, relative to a second thruster or other plurality of thrusters 112.

In various related embodiments, this unique thruster configuration 110 enables a designer to create VTOL aircraft which are as compact as possible along the longitudinal or lateral axis depending on the configuration. The thruster configuration 110 can be used for designing compact drones, flying cars, hoverbikes, hoverboards, jetpacks, personal air aircrafts and a variety of other configurations, including novelty configurations, such as fish or other animals, arrows, etc.

In a related embodiment, as shown in FIG. 1A, a linear thruster aircraft 100 can include at least four thrusters 112 arranged in a linear array/thruster arrangement 110, which runs along the longitudinal axis 142 of an aircraft 100. In this embodiment, the thrusters 112 can be placed above the center of mass 194, and thereby lift the aircraft 100 from the top.

In a related embodiment, as shown in FIG. 1A, a linear thruster aircraft 100 can include at least four thrusters 112 arranged in a linear array 110, which runs along the longitudinal axis 142 of an aircraft 100. The thrusters can be placed above the center of mass 194, as shown in FIG. 1A, or alternatively below the center of mass 194, and thereby lift the aircraft 100 from the bottom.

In a related embodiment, as shown in FIG. 1A, one or more thrusters 112 can be arranged in a linear array 110. One or more thrusters 112 can be laterally angled to produce thrust vectors 172, 174 which produces some amount of force along the lateral axis of the thruster arrangement 110. This lateral force allows the thruster arrangement 110 to provide stability and control by rotating the aircraft 100 around the center of mass 194. Thrusters 112 which run along the longitudinal axis 142 of the thruster arrangement 110 provide control around the longitudinal axis 142 of the thruster arrangement 110. Opposing thrusters 112 from across the lateral axis of the thruster arrangement 110 provide pitch control. While the aircraft 100 is hovering, the lateral forces cancel each other out. Yaw control is provided through differential thrust between thrusters 112 with opposing lateral forces and/or rotor torque in the case that the thrusters 112 are rotors.

In a related embodiment, as shown in FIG. 1A-1E, a thruster pair 710, 720 can include:
 a) a first thruster 131, which is mounted at a right lateral angle 162 relative to the longitudinal axis 142, to produce a right thrust vector 172; and
 b) a second thruster 132, which is mounted at a left lateral angle 164 relative to the longitudinal axis 142, to produce a left thrust vector 174;
  wherein the first and second thrusters 131, 132 are left-right symmetrically mounted, with opposing right and left lateral angles 162, 164;
  wherein, as shown, the linear thruster aircraft 100 can include at least two thruster pairs 710, 720 mounted front and rear along the longitudinal axis 142.

In a further related embodiment, the front and rear order of the first and second thrusters 710, 720 can be reversed, such that a first thruster 131 can be configured with a right lateral angle 162, and a second thruster 132 can be configured with a left lateral angle 164.

In a related embodiment, as shown in FIG. 1A, the linear thruster aircraft 100 can be configured such that the thrusters 112 lift the aircraft 100 from the top and are placed above the center of mass 194. The first thruster 131 can be positioned at a front 102 of the aircraft 100, and a fourth thruster 134 can be positioned at a rear 104 of the aircraft 100;

wherein each thruster 131, 132, 133, 134 of the first linear thruster arrangement 110 is mounted along a longitudinal axis 142 of the airframe 120, sequentially from the front 102 to the rear 104;
wherein the first and fourth thrusters 131, 134 are configured with a leftward tilt 162, such that the first and fourth thrusters 131, 134 provide a (i.e. is configured with a) rightward downward thrust 172; and wherein the second and third thrusters 132, 133 are configured with a rightward tilt 164, such that the first and fourth thrusters 131, 134 provide a (i.e. is configured with a) leftward downward thrust 174; such that:
 a) The first and second thrusters 131, 132 are configured to provide positive pitch 151 of the linear thruster aircraft 100, when increased differential thrust is applied to the first and second thrusters 131, 132;
 b) The third and fourth thrusters 133, 134 are configured to provide negative pitch 152 of the linear thruster aircraft 100, when increased differential thrust is applied to the third and fourth thrusters 133, 134;
 c) The second and third thrusters 132, 133 are configured to provide right roll 153 of the linear thruster aircraft 100, when increased differential thrust is applied to the second and third thrusters 132, 133;
 d) The first and fourth thrusters 131, 134 are configured to provide left roll 154 of the linear thruster aircraft 100, when increased differential thrust is applied to the first and fourth thrusters 131, 134;
 e) The second and fourth thrusters 132, 134 are configured to provide right yaw 155 of the linear thruster aircraft 100, when increased differential thrust is applied to the second and fourth thrusters 132, 134; and
 f) The first and third thrusters 131, 133 are configured to provide left yaw 156 of the linear thruster aircraft 100, when increased differential thrust is applied to the first and third thrusters 131, 133.

In a related embodiment, as shown in FIG. 4A, a linear thruster aircraft can be configured with thrusters 112 that can be spinning rotors 112, such that each rotor/thruster 112 can be configured to spin inside a rotor shroud 610, which is located above stationary control vanes 622, 624, which redirect the downward flowing air to the lateral sides of the thruster 112. In this embodiment, the thrusters 112 do not necessarily need to be mounted at angles since they can rely on the control vanes 622, 624 to create the necessary lateral forces.

Figure 5:
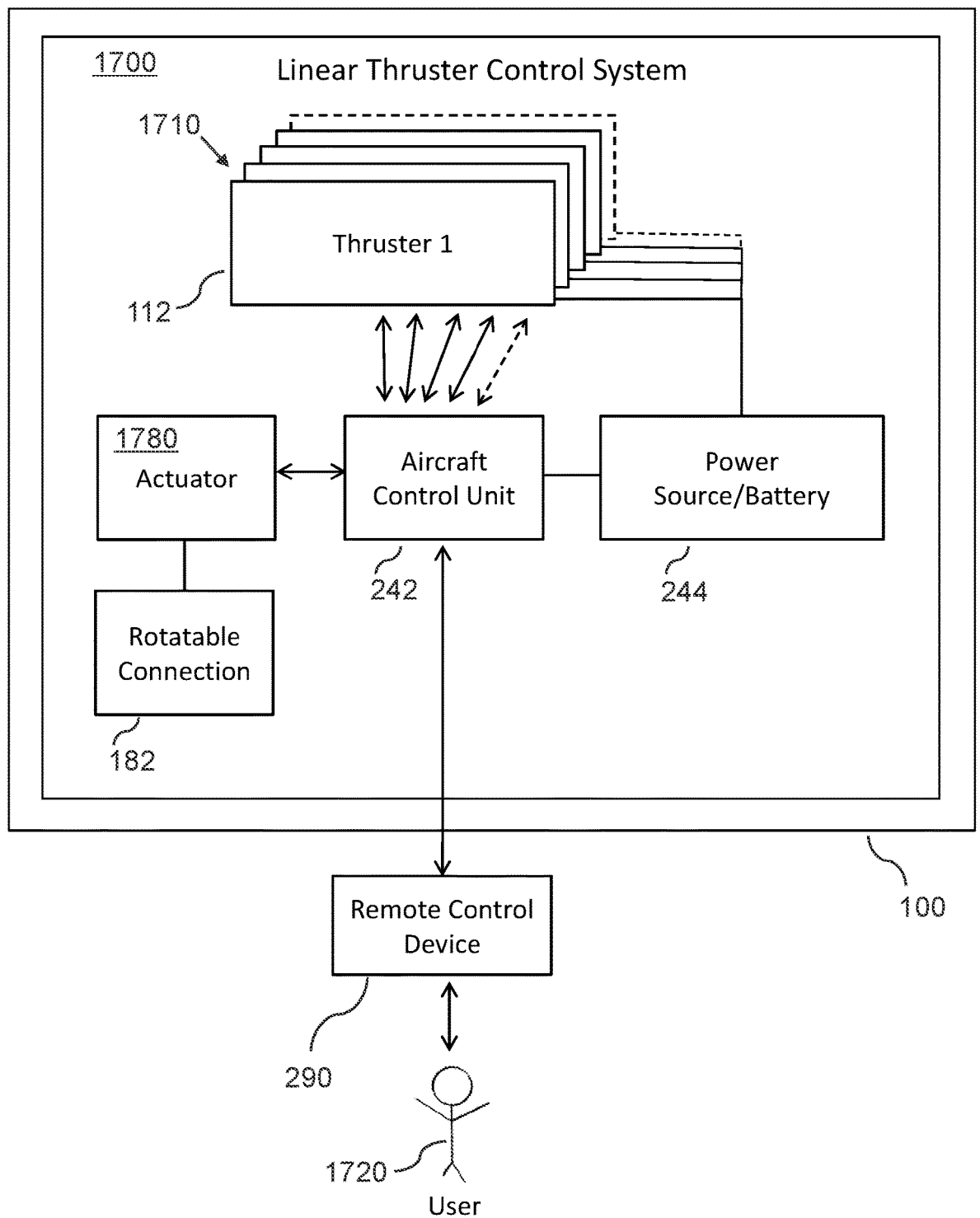
FIG. 5 is a schematic diagram illustrating a linear thruster system, according to an embodiment of the invention.

In an embodiment, as shown in FIG. 5, a linear thruster system 1700 can include:
 a) a linear thruster arrangement 1710, including a plurality of thrusters 112;
 b) a power source 244, such as a battery 244; and
 c) an aircraft control unit 242, which can be mounted in a main body 124 of the aircraft 100;
 wherein the aircraft control unit 242 is configured to control a specific power applied for each thruster 112 in the plurality of thrusters 112, wherein the specific power applied for each thruster 112 is provided by the power source 244.

In a related embodiment, as shown in FIG. 6, an aircraft control unit 242 can include:
 a) A processor 1802;
 b) A non-transitory memory 1804;
 c) An input/output component 1806; and
 d) A power manager 1810, which is configured to control the specific power applied for each thruster 112 in the plurality of thrusters 112; all connected via
 e) A data bus 1820.

Figure 1D:
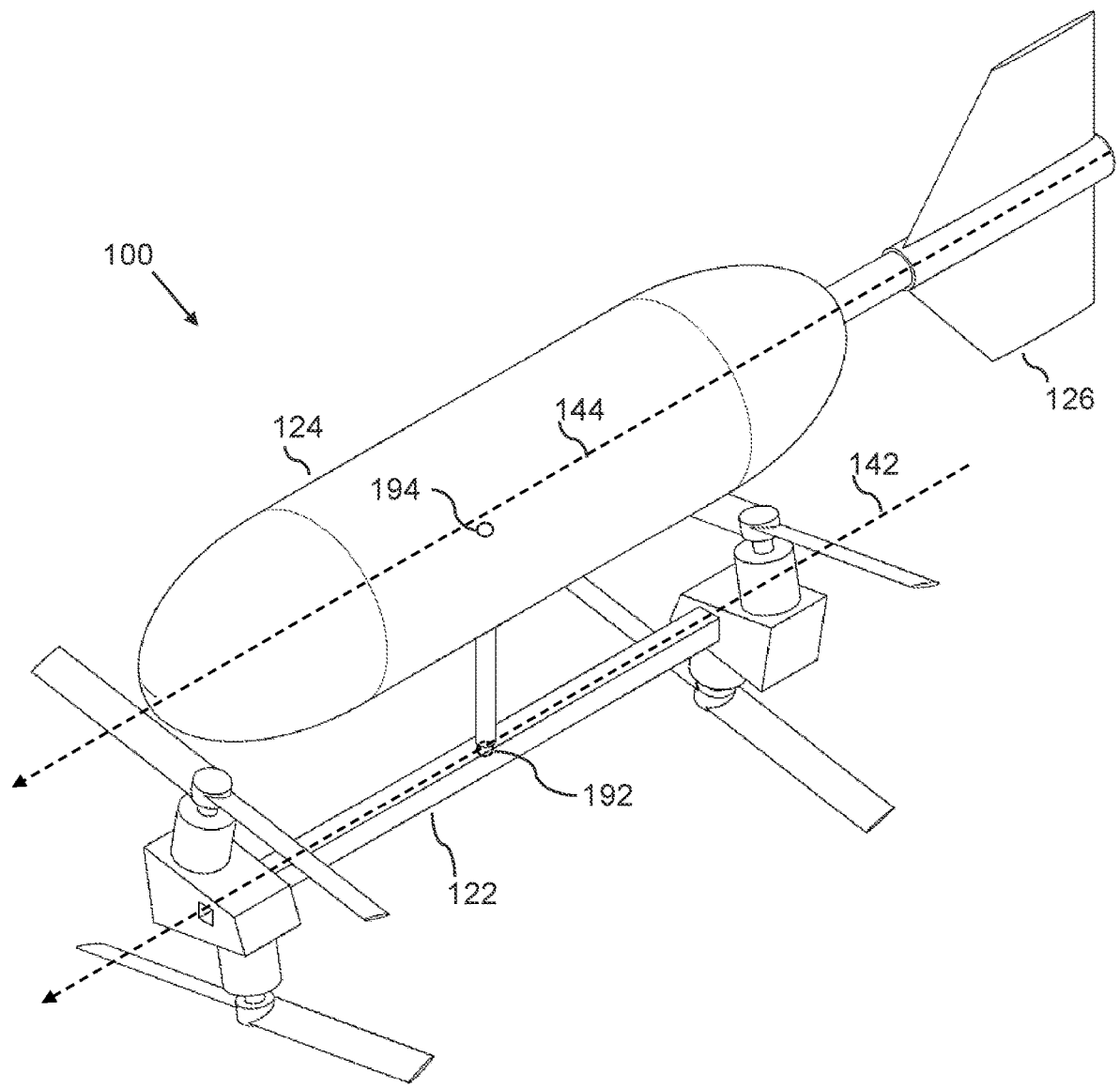
FIG. 1D is a perspective view of the embodiment of the linear thruster aircraft shown in FIG. 1A, shown oriented in a flight mode with the linear thruster arrangement longitudinally positioned below a center of mass of the linear thruster aircraft.

In an embodiment, as shown in FIGS. 1A-1C, a linear thruster aircraft 100 200 can include:
 a) a first linear thruster arrangement 110, including:
  a first thruster 131; and
  a second thruster 132;
  a third thruster 133; and
  a fourth thruster 134; and
 b) an airframe 120, which can include:
  an elongated mounting nacelle 122; and
  a main body 124, which can include an aircraft control unit 242, wherein the main body 124 is connected to the elongated mounting nacelle 122;
 wherein each thruster 112 of the first linear thruster arrangement 110 can be connected to the airframe 120, at least substantially along an elongated axis 142 of the airframe 120, for example such that each thruster 112 can be connected to the elongated mounting nacelle 122 at least substantially along an elongated axis 142 of the elongated mounting nacelle 122, such that the elongated axis 142 can for example be a lateral axis 344 or a longitudinal axis 142 of the airframe 120;
 wherein a center of lateral forces 192 of the first linear thruster arrangement 110 can be vertically displaced from the center of mass 194 of the linear thruster aircraft 100, such that the first linear thruster arrangement 110 is positioned either above or below the center of mass 194, as shown in respectively FIGS. 1A and 1D, depending on a vertical orientation of the linear thruster aircraft 100;
 wherein the first and second thrusters 331, 332 are positioned/mounted on a front/right/first side of the center of mass 194 of the linear thruster aircraft 100, with respect to a perpendicular plane 170 of the center of mass 194, wherein the perpendicular plane 170 is perpendicular to the elongated axis 142 of the linear thruster aircraft 100;
 wherein the third and fourth thrusters 333, 334 are positioned/mounted behind/left/to a second (opposite) side of the center of mass 194 of the linear thruster aircraft 100, with respect to the perpendicular plane 170 of the center of mass 194;
 wherein the first and second thrusters 331, 332 can include at least one thruster 112 configured to provide a rightward downward thrust 172 with respect to the elongated axis 142 and at least one thruster 112 configured to provide a leftward downward thrust 174 with respect to the elongated axis 142; and
 wherein the third and fourth thrusters 333,334 can include at least one thruster 112 configured to provide a rightward downward thrust 172 with respect to the elongated axis 142 and at least one thruster 112 configured to provide a leftward downward thrust 174 with respect to the elongated axis 142.

In a related embodiment, as shown in FIGS. 1A-1C, a center of lateral, longitudinal, and vertical forces 192 (i.e. a center of thrust forces 192) may coincide with a center of mass 194 of the linear thruster arrangement 110 (due to the symmetrical arrangement of thrusters);
wherein the center of mass 192 of the linear thruster arrangement 110 is positioned above the center of mass 194 of the linear thruster aircraft 100.

In a related embodiment, as shown in FIGS. 1A-1C, each thruster 112 of the first linear thruster arrangement 110 can be mounted along a longitudinal axis 142 of the airframe 120.

In a related embodiment, each thruster 112 of the first linear thruster arrangement 110 can be mounted along a lateral axis 344 of the airframe 120.

In a related embodiment, as shown in FIG. FIGS. 1A-1C, each thruster 112 of the first linear thruster arrangement 110 can be a rotor.

In a related embodiment, as shown in FIG. FIGS. 1A-1C, the first linear thruster arrangement 110 can be positioned above a center of mass 194 of the linear thruster aircraft 100, such that the first linear thruster arrangement 110 lifts the linear thruster aircraft 100 from a top of the linear thruster aircraft 100.

Figure 1E:
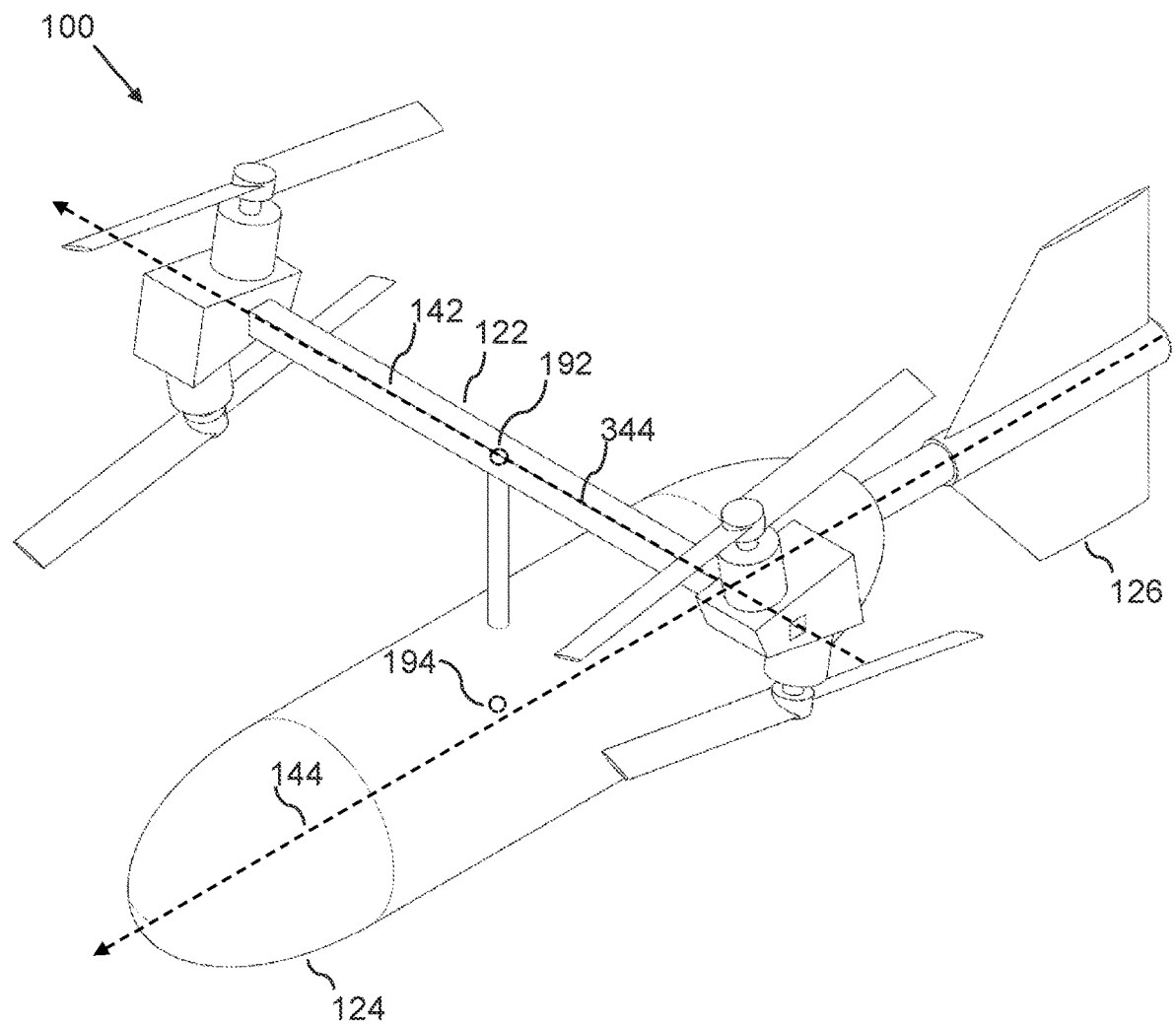
FIG. 1E is a perspective view of the embodiment of the linear thruster aircraft shown in FIG. 1A, shown oriented in a flight mode with the linear thruster arrangement laterally positioned above a center of mass of the linear thruster aircraft.
Figure 1F:
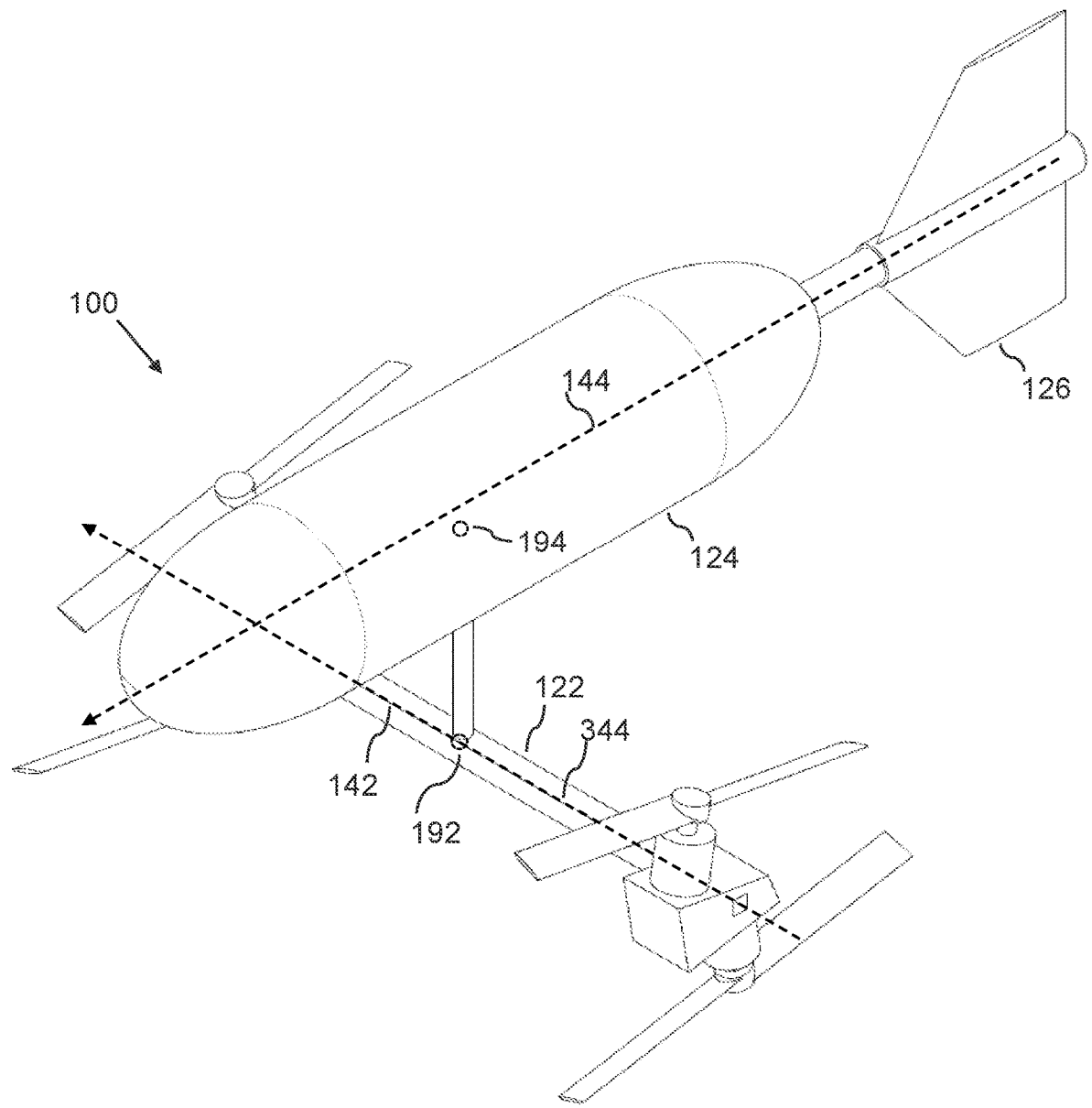
FIG. 1F is a perspective view of the embodiment of the linear thruster aircraft shown in FIG. 1A, shown oriented in a flight mode with the linear thruster arrangement laterally positioned below a center of mass of the linear thruster aircraft.

In a related embodiment, as shown in FIGS. 1D and 1F, which show an inverted orientation of the linear thruster aircraft 100, the first linear thruster arrangement 110 can be positioned below a center of mass 194 of the linear thruster aircraft 100, such that the linear thruster arrangement 110 lifts the linear thruster aircraft 100 from a bottom of the linear thruster aircraft 100. When the linear thruster aircraft 100 is flown in the inverted orientation, as shown in FIGS. 1D and 1F, the sideward downward thrust 172, 174 is accomplished by a reverse rotation of the thrusters 112 (i.e. reverse thrust), compared to a rotation of the thrusters 112 when the linear thruster aircraft 100 is flown in the regular orientation, as shown in FIG. 1A.

In a related embodiment, as shown in FIGS. 1A-1F, the main body 124 can be rotatably connected to the elongated mounting nacelle 122 with a rotatable connection 182, which for example be a circular ball bearing or other form of rotatable mechanical bearing bearing.

In another related embodiment, as shown in FIGS. 1A and 1D, the main body 124 can be lockably rotatably 184 connected 182 to the elongated mounting nacelle 122; wherein the rotatable connection 182 is lockable, such that the elongated mounting nacelle 122 can be locked in position in a longitudinal orientation relative to the main body 124, such that a center axis of the elongated mounting nacelle 122 is parallel to a center axis of the main body 124.

In another related embodiment, as shown in FIGS. 1E and 1F, the main body can be lockably rotatably 184 connected 182 to the elongated mounting nacelle 122; wherein the rotatable connection 182 is lockable, such that the elongated mounting nacelle 122 can be locked in position in a lateral orientation relative to the main body 124, such that a center axis of the elongated mounting nacelle 122 is perpendicular to a center axis of the main body 124.

In a further related embodiment, a rotatable 184 connection 182 of the main body 124 to the elongated mounting nacelle 122 can be configured to be lockable, such that the rotatable 184 connection 182 can be unlocked to allow adjustment of a position of the elongated mounting nacelle 122, and the rotatable 184 connection 182 can be locked, such that the elongated mounting nacelle 122 can be locked in position, such as in a longitudinal or lateral position, relative to an elongated center axis of the main body 124. Alternatively, the rotatable 184 connection 182 can be left unlocked, such that the main body 124 is free to rotate relative to the to the elongated mounting nacelle 122 during flight of the linear thruster aircraft 100, wherein the main body 124 can be stabilized by the vertical stabilizer 126. The lockable connection 182 can for example be a push connection 182, such that one push locks the connection and a subsequent push unlocks the connection 182.

In a yet further related embodiment, as shown in FIGS. 1 and 5, the linear thruster aircraft 100 can further include an aircraft control unit 242, which is mounted in the airframe 120, wherein the aircraft control unit 242 is configured to independently control a specific power applied for each thruster 112 in the at least one linear thruster arrangement 110; and wherein the aircraft control unit 242 is configured to control the rotatable 184 connection 182, such that the aircraft control unit 242 is configured to lock the rotatable 184 connection 182, and such that the aircraft control unit 242 is configured to release the rotatable 184 connection 182.

In a related embodiment, as shown in FIGS. 1A-1F, the airframe 120 can further include:
  a) a connection axle 128, which is connected between the elongated mounting nacelle 122 and the main body 124;
  wherein the connection axle 128 can be rigidly connected (i.e. non-rotatable) to the elongated mounting nacelle 122 and rotatably or lockably rotatably connected to the main body 124.

In a further related embodiment, the rotatable 184 connection 182 can for example be lockable with a screw 183 that screws into the connection axle 128, the screw 183 can be controlled by an actuator 1780, which is controlled by the aircraft control unit 242. Alternatively, a pin or other type of mechanical locking arrangement can be used.

In a related alternative embodiment, the connection axle 128 can be rotatably or lockably rotatably connected to the elongated mounting nacelle 122 and rigidly connected to the main body 124.

In another related alternative embodiment, the connection axle 128 can be rigidly connected to the elongated mounting nacelle 122 and rigidly connected to the main body 124, such that the elongated mounting nacelle 122 can be oriented in a fixed longitudinal 142 or lateral orientation 344 relative to the main body 124.

In a related embodiment, as shown in FIGS. 1A-1F, the airframe 120 can further include:
  a) a tail wing 126, which can be a vertical stabilizer 126, which is connected to a rear end of the main body 124.

In a related embodiment, as shown in FIGS. 4A and 4B, the linear thruster aircraft 100 can further include a plurality of rotor shrouds 610, wherein each thruster 112 of the first linear thruster arrangement 110 is configured to spin inside a rotor shroud 610.

In a related embodiment, as shown in FIGS. 1A-1C, the linear thruster aircraft 100 can be configured such that:
  a) the first thruster 331 can be mounted at a right lateral angle 162 relative to the elongated axis 142, such that the first thruster 331 is configured to provide a rightward downward thrust 172; and
  b) a second thruster 332 can be mounted at a left lateral angle 164 relative to the elongated axis 142, such that the second thruster 332 is configured to provide a leftward downward thrust 174.

In a related embodiment, as shown in FIGS. 1A-1C,
each thruster 112 of the first linear thruster arrangement 110 can be mounted along a longitudinal axis of the airframe 120;
wherein the first linear thruster arrangement 110 can be positioned above a center of mass 194 of the linear thruster aircraft 100;
wherein the first and fourth thrusters 131, 134 are configured with a rightward downward thrust 172 with respect to the elongated axis 142; and
wherein the second and third thrusters 132, 133 are configured with a leftward downward thrust 174 with respect to the elongated axis 142, such that:
  the first and second thrusters 131, 132 are configured to provide a positive pitch 151 of the linear thruster aircraft 100, when a first increased differential thrust is applied to the first and second thrusters 131, 132;

the third and fourth thrusters 133, 134 are configured to provide a negative pitch 152 of the linear thruster aircraft 100, when a second increased differential thrust is applied to the third and fourth thrusters 133 134;

the second and third thrusters 132, 133 are configured to provide a right roll 153 of the linear thruster aircraft 100, when a third increased differential thrust is applied to the second and third thrusters 132, 133;

the first and fourth thrusters 131, 134 are configured to provide a left roll 154 of the linear thruster aircraft 100, when a fourth increased differential thrust is applied to the first and fourth thrusters 131 134;

the second and fourth thrusters 132, 134 are configured to provide a right yaw 155 of the linear thruster aircraft 100, when a fifth increased differential thrust is applied to the second and fourth thrusters 132 134; and the first and third thrusters 131, 133 are configured to provide a left yaw 156 of the linear thruster aircraft, when a sixth increased differential thrust is applied to the first and third thrusters 131, 133.

In a related embodiment, it is readily apparent to an aircraft designer of ordinary skill in the art that the rightward-leftward order of thrusters 112 can be reversed, while the first linear thruster arrangement retains ability to provide lift, pitch, roll, and yaw for the linear thruster aircraft.

Thus, in a related embodiment, as shown in FIG. 1A, each thruster 112 of the first linear thruster arrangement 110 can be mounted along a longitudinal axis 142 of the airframe;

wherein the first linear thruster arrangement 110 is positioned above a center of mass 194 of the linear thruster aircraft;

wherein the first and fourth thrusters 131, 134 can be configured with a first sideward downward thrust 172, 174 with respect to the longitudinal axis 142, which can be a rightward downward thrust 172 or a leftward downward thrust 174; and wherein the second and third thrusters 132, 133 are configured with a second sideward downward thrust 172, 174 with respect to the longitudinal axis, which can be respectively a leftward downward thrust 174 or a rightward downward thrust 172; such that:

the first and second thrusters 131, 132 are configured to provide a positive pitch 151 of the linear thruster aircraft 100, when a first increased differential thrust is applied to the first and second thrusters 131 132;

the third and fourth thrusters 133, 134 are configured to provide a negative pitch 152 of the linear thruster aircraft 100, when a second increased differential thrust is applied to the third and fourth thrusters 133 134;

the second and third thrusters 132, 133 are configured to provide a first side roll 153, 154 of the linear thruster aircraft 100, when a third increased differential thrust is applied to the second and third thrusters 132, 133;

the first and fourth thrusters 131, 134 are configured to provide a second side roll 154, 153 of the linear thruster aircraft 100, when a fourth increased differential thrust is applied to the first and fourth thrusters 131 134;

the second and fourth thrusters 132, 134 are configured to provide a first side yaw 155, 156 of the linear thruster aircraft 100, when a sixth increased differential thrust is applied to the second and fourth thrusters 132, 134; and the first and third thrusters 131, 133 are configured to provide a second side yaw 156, 155 of the linear thruster aircraft, when a fifth increased differential thrust is applied to the first and third thrusters 131, 133.

In a related embodiment, as shown in FIGS. 1A-1C, the first linear thruster arrangement 110 can be positioned above a center of mass 194 of the linear thruster aircraft 100; wherein the first and fourth thrusters are configured with a leftward tilt 162, and the second and third thrusters are configured with a rightward tilt 164.

In a related embodiment, as shown in FIGS. 4A and 4B, the linear thruster aircraft can further include a plurality of control vanes 622, 624, wherein the first linear thruster arrangement can be positioned above a center of mass of the linear thruster aircraft;

wherein the first and fourth thrusters can be configured with rightward oriented control vanes 622, and the second and third thrusters can be configured with leftward oriented control vanes 624.

FIG. 4A shows a front view of rightward oriented control vanes 622, creating a rightward downward thrust 672.

FIG. 4B shows a front view of leftward oriented control vanes 624, creating a leftward downward thrust 674.

In a related embodiment, as shown in FIGS. 1D and 1F, the first linear thruster arrangement 110 can be positioned below a center of mass 194 of a linear thruster aircraft; wherein the first and fourth thrusters are configured with a leftward tilt 162, and the second and third thrusters are configured with a rightward tilt 164;

such that the right/first and left/second side roll is reversed compared to the linear thruster aircraft 100 with the first linear thruster arrangement 110 positioned above the center of mass 194.

Thus, in a related embodiment, as shown in FIGS. 1A and 1D, each thruster 131, 132, 133, 134 of the first linear thruster arrangement 110 can be mounted substantially along a longitudinal axis 142 of the airframe 120;

wherein the first linear thruster arrangement 110 is positioned below a center of mass 194 of the linear thruster aircraft 100, as shown in FIG. 1D;

wherein the first and fourth thrusters 131, 134 are configured with a first sideward downward thrust 172, 174 with respect to the longitudinal axis 142, which can be a rightward downward thrust 172 or a leftward downward thrust 174; and wherein the second and third thrusters 132, 133 are configured with a second sideward downward thrust 172, 174 with respect to the longitudinal axis 142, which can be respectively a leftward downward thrust 174 or a rightward downward thrust 172; such that:

the first and second thrusters 131, 132 are configured to provide a positive pitch 151 of the linear thruster aircraft 100, when a first increased differential thrust is applied to the first and second thrusters 431, 432;

the third and fourth thrusters 133, 134 are configured to provide a negative pitch 152 of the linear thruster aircraft 100, when a second increased differential thrust is applied to the third and fourth thrusters 133, 134;

the first and fourth thrusters 131, 134 are configured to provide a first side roll 153, 154 of the linear thruster aircraft 100, when a third increased differential thrust is applied to the first and fourth thrusters 131, 134;

the second and third thrusters 132, 133 are configured to provide a second side roll 154, 153 of the linear thruster aircraft 100, when a fourth increased differential thrust is applied to the second and third thrusters 132, 133;

the second and fourth thrusters 132, 134 are configured to provide a first side yaw 155 of the linear thruster aircraft 100, when a fifth increased differential thrust is applied to the second and fourth thrusters 132, 134;

the first and third thrusters 131, 133 are configured to provide a second yaw 156 of the linear thruster aircraft 100, when a sixth increased differential thrust is applied to the first and third thrusters 131, 133.

In a related embodiment, it is readily apparent to an aircraft designer of ordinary skill in the art that the front-rear order of thrusters 112 can be reversed, while the first linear thruster arrangement retains ability to provide lift, pitch, roll, and yaw for the linear thruster aircraft.

Thus, in related embodiments, a linear thruster aircraft 100 can be configured such that:

a) the first and second thrusters 131, 132 comprise at least one first rightward thruster 112 configured to provide a first sideward/rightward downward thrust 172 with respect to the elongated axis 142, and at least one first leftward thruster 112 configured to provide a second sideward/leftward downward thrust 174 with respect to the elongated axis 141; and b) the third and fourth thrusters 133 134 comprise at least one second rightward thruster 112 configured to provide a first sideward/rightward downward thrust 172, and at least one second leftward thruster configured to provide a second sideward/leftward downward thrust 174;

such that the at least one linear thruster arrangement 110 is configured to provide lift 160, pitch 151, 152, roll 153 154, and yaw 155, 156 for the linear thruster aircraft 100, 200, by independently controlling a differential thrust for each of the first, second, third, and fourth thrusters 131, 132, 133, 134. In some related embodiments, yaw can be provided solely by increased rotational torque from a horizontal outer thruster (i.e. neither rightward/frontward or leftward/rearward oriented).

In a related embodiment, the linear thruster aircraft can further include a second linear thruster arrangement, wherein the second linear thruster arrangement is mounted below the first linear thruster arrangement.

In a related embodiment, the linear thruster aircraft can further include a second linear thruster arrangement, wherein the second linear thruster arrangement is mounted to a side of the first linear thruster arrangement.

In various related embodiments, a linear thruster aircraft, can include a linear thruster arrangement with more than four thrusters 112, such as for example eight or more thrusters 112, which can be configured with alternating first sideward/rightward and second sideward/leftward downward thrust.

In a related embodiment, as shown in FIG. 1A, the linear thruster aircraft 100 can further include an aircraft control unit 242, which is mounted in the airframe 120, for example in a main body 124, wherein the aircraft control unit 242 is configured to independently control a specific power applied for each thruster 112 in the linear thruster arrangement 110.

In a further related embodiment, as shown in FIGS. 1A and 5, the linear thruster aircraft 100 can be configured to communicate, via the aircraft control unit 242, with a remote control device 290, such that a user 1720 can use the remote control device 290 to control the linear thruster aircraft 100.

In a related embodiment, as shown in FIG. 6, the aircraft control unit 242 can further include:

a) a processor 1802;
b) a non-transitory memory 1804;
c) an input/output component 1806; and
d) a power manager 1810 (that can also be referred to as a flight manager 1810), which is configured to control the specific power applied for each thruster 112 in the first linear thruster arrangement 110; all connected via
e) a data bus 1820.

In related embodiments, the power manager 1810 can execute flight control software that is loaded into memory 1804, and the aircraft control unit 242 can further include (or communicate with) flight control/avionic systems/components such as accelerometers, gyros, barometer, GPS, etc.

In an embodiment, as shown in FIGS. 1A-1C, a linear thruster aircraft 100 can include:

a) a linear thruster arrangement 110, comprising
  a first plurality 710 of at least two thrusters 131, 132, which are positioned to a front side/first side of a center of mass 194 of the linear thruster aircraft 100, with respect to a perpendicular plane 170 of the center of mass, which perpendicular plane 170 is perpendicular to an elongated axis 142 of the linear thruster aircraft 100; and
  a second plurality 720 of at least two thrusters 133, 134, which are positioned to a rear side/second (i.e. opposite) side of the center of mass 194 of the linear thruster aircraft 100, with respect to the perpendicular plane 170 of the center of mass 194;
wherein each thruster 112 of the at least one linear thruster arrangement is positioned along an elongated axis 142 of the linear thruster aircraft 100;
wherein the first plurality comprises at least one thruster configured to provide a right/rear/first sideward downward thrust 172 and at least one thruster configured to provide a left/front/opposite second sideward downward thrust 174; and
wherein the second plurality comprises at least one thruster configured to provide a right/rear/first sideward downward thrust 172 and at least one thruster configured to provide a left/front/opposite second downward thrust 174.

In a related embodiment, the first plurality can include first and second thrusters 131 132, and the second plurality can include third and fourth thrusters 133 134;
wherein the first and fourth thrusters 131, 134 are configured with a first sideward downward thrust 172 with respect to the elongated axis 142, and the second and third thrusters 132, 133 are configured with a second sideward downward thrust 174 with respect to the elongated axis 142.

In a related embodiment, as shown in FIG. 1A-1C, the linear thruster aircraft 100 can be configured such that each pair 710, 720 of the two front rotors 131, 132 and the two rear rotors 133, 134 can be mounted at least partially vertically overlapping or fully vertically overlapping (if there is no lateral offset), wherein each at least partially overlapping thruster pair 710, 720 includes a first/top thruster 132, 134 and a second/bottom thruster 131, 133, to save space and create a more compact unit.

In a related embodiment, as shown in FIG. 1A-1C, a linear thruster aircraft 100, can be configured such that each thruster of the first linear thruster arrangement is positioned substantially along an elongated axis 142 of the linear thruster aircraft; wherein thruster are positioned to offset propeller hubs in an offset configuration, such that the first, second, third, and fourth thrusters are configured with alternating first/right/left 502, 504 and second/left/right side lateral offsets 504, 502 from the elongated axis.

In a related embodiment, as shown in FIGS. 1A, 1B, and 1C, the linear thruster aircraft 100 can be configured such that each thruster of the first, second, third, and fourth thrusters are configured with alternating first and second side lateral offsets 502, 504 from the elongated axis. The alternating first and second side lateral offsets 502, 504 can aid in providing increased maneuverability of the aircraft 100 by increasing mechanical leverage/torque relative to the elongated axis 142.

In another related embodiment, as shown in FIG. 1A-1C, the linear thruster aircraft 100 can be configured such that each thruster of the first, second, third, and fourth thrusters are configured with alternating first and second side vertical offsets 602, 604 from the elongated axis 142. The alternating first and second side vertical offsets 602, 604 can aid in providing increased maneuverability of the aircraft 100 by increasing mechanical leverage/torque relative to the elongated axis 142.

In a further related embodiment, as shown in FIG. 1A-1C, the linear thruster aircraft 100 can be configured such that the first thruster 131 and the second thruster 132 are at least partially vertically overlapping; and the third thruster 133 and the fourth thruster 134 are at least partially vertically overlapping, such that each of the thruster pairs 710, 720 can include a vertically stacked pair of thrusters 131.

In a related embodiment, as shown in FIGS. 1A, 1B, and 1C, the linear thruster arrangement 110 can be configured symmetrically:

a) wherein the first thruster 131 and the fourth thruster 134 can be configured with:
1) uniform first/right-sideward downward thrusts 172, each with an identical first side lateral angle 162, such that a first side lateral angle 162 of the first thruster 131 is the same as a first side lateral angle 162 of the fourth thruster 134;
2) opposing respective bottom/negative and top/positive vertical offsets 602, 604, which are each of an identical absolute length, such that an absolute value of a length of the bottom vertical offset 602 of the first thruster 131 is the same as an absolute value of a length of the top vertical offset 604 of the fourth thruster 134; and
3) uniform second/left side lateral offsets 504, which are each of an identical length, such that a length of the lateral offset 504 of the first thruster 131 is the same as a length of the lateral offset 504 of the fourth thruster 134; and b) wherein the second thruster 132 and the third thruster 133 can be configured with:
1) uniform second/left-sideward downward thrusts 172, each with an identical second side lateral angle 164, such that a lateral angle 164 of the second thruster 132 is the same as a lateral angle 164 of the third thruster 133;
    such that absolute values of the first side lateral angles 162 of the first thruster 131 and the fourth thruster 134 are identical to absolute values of the second side lateral angles 164 of the second thruster 132 and the third thruster 133;
2) opposing respective top/positive and bottom/negative vertical offsets 604, 602, which are each of an identical absolute length, such that an absolute value of a length of the top vertical offset 604 of the second thruster 132 is the same as an absolute value of a length of the bottom vertical offset 602 of the third thruster 133;
    such that absolute values of the vertical offsets 602, 604 of the first thruster 131 and the fourth thruster 134 are identical to absolute values of the opposing respective top/positive and bottom/negative vertical offsets 604, 602 of the second thruster 132 and the third thruster 133; and
3) uniform first/right side lateral offsets 502, which are each of an identical length, such that a length of the lateral offset 502 of the first thruster 131 is the same as a length of a length of the lateral offset 502 of the fourth thruster 134;
    such that absolute values of the lateral offsets 504 of the first thruster 131 and the fourth thruster 134 are identical to absolute values of the lateral offsets 502 of the second thruster 132 and the third thruster 133.

Figure 2A:
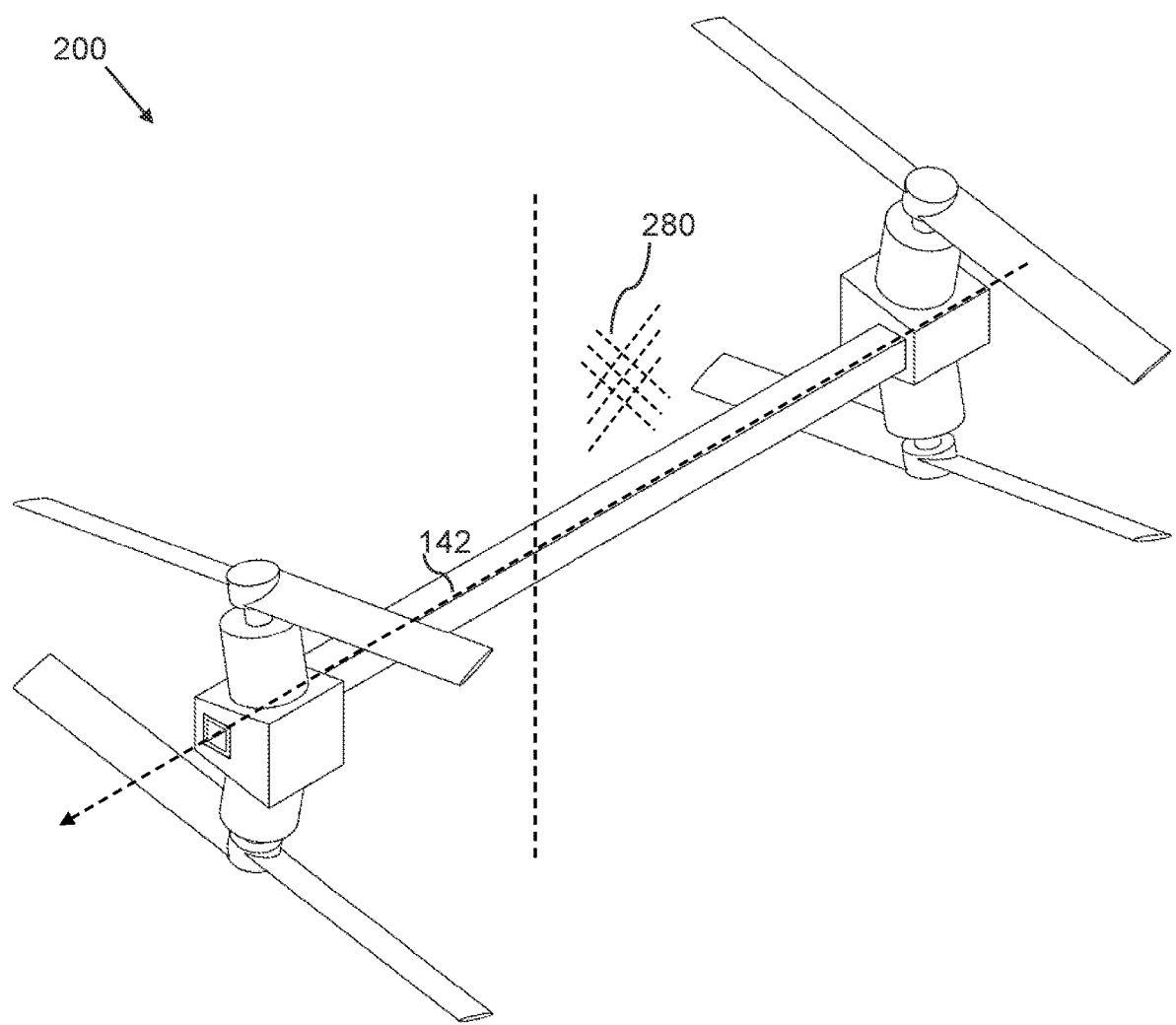
FIG. 2A is a perspective view of a linear thruster aircraft, according to an embodiment of the invention.
Figure 2B:
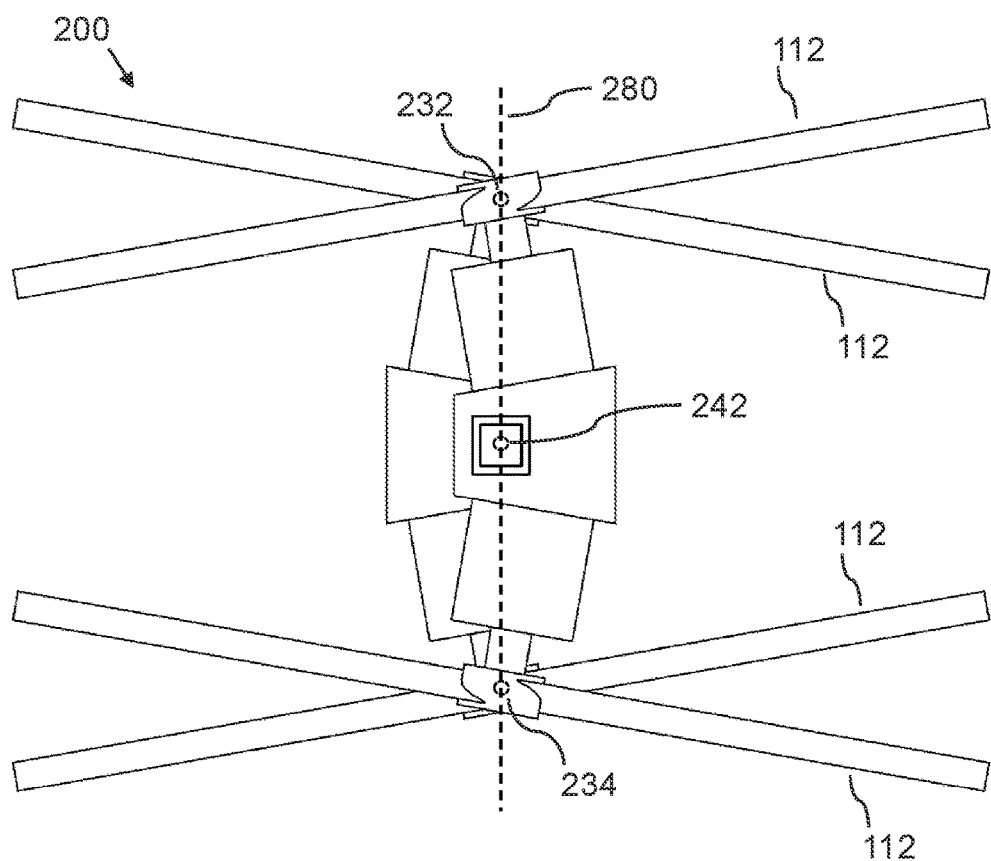
FIG. 2B is a front view of portions of the linear thruster aircraft shown in FIG. 2A.
Figure 2C:
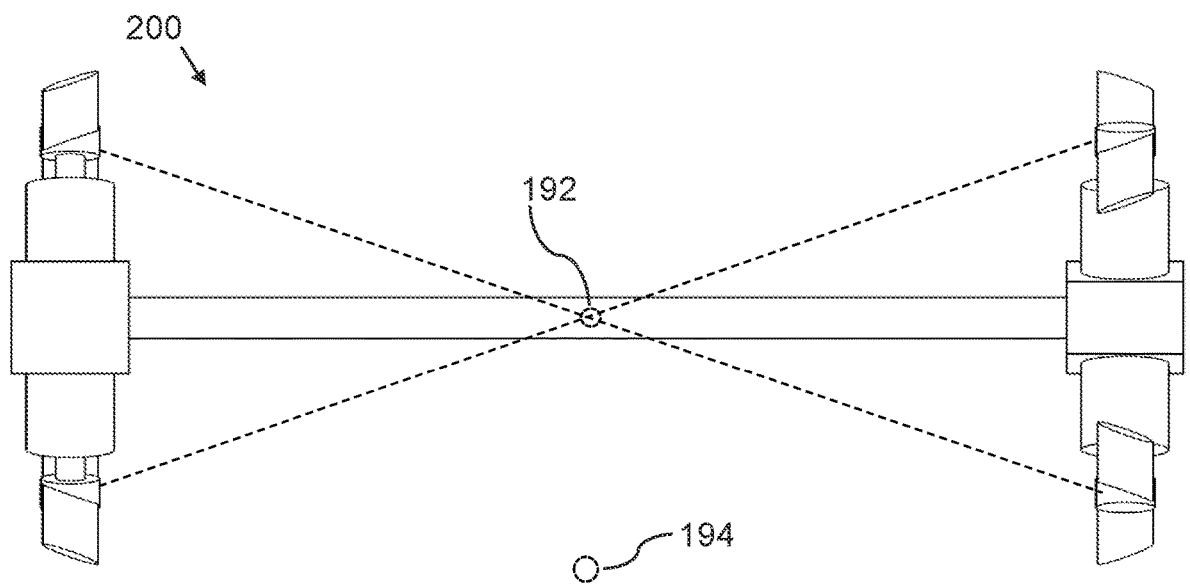
FIG. 2C is a side view of portions of the linear thruster aircraft shown in FIG. 2A.

In various related embodiments, FIGS. 2A, 2B, and 2C show a first simplified linear thruster aircraft 200, which is a simplified variant of the linear thruster aircraft 100, wherein there is no lateral offset of the thrusters, wherein thrusters are positioned to align 210 propeller hubs vertically, such that hub centers 232, 234 of thrusters 112 are positioned in a vertical plane 280 of the elongated center axis 242.

In other various related embodiments, FIG. 3A shows a second simplified linear thruster aircraft 300A, which is a simplified variant of the linear thruster aircraft 100, wherein there is no lateral offset and no relative/alternating vertical offset of the thrusters and the thrusters are not overlapping, such that all the thrusters are positioned linearly along an elongated axis of the second simplified linear thruster aircraft 300A. Each thruster 112 can, for practical reasons, be mounted with a uniform vertical offset 348 from an elongated mounting nacelle 342, such that hub centers 343 of the thrusters 112 are positioned along a hub center line 346 which is parallel to and in a vertical plane of the elongated mounting nacelle 342, such that the thrusters 112 are mounted with no relative vertical offset along the hub center line 346. The uniform vertical offset 348 is here positive showing a mounting of the thrusters 112 above the elongated mounting nacelle 342 and above a center of gravity of the second simplified linear thruster aircraft 300A.

Figure 3B:
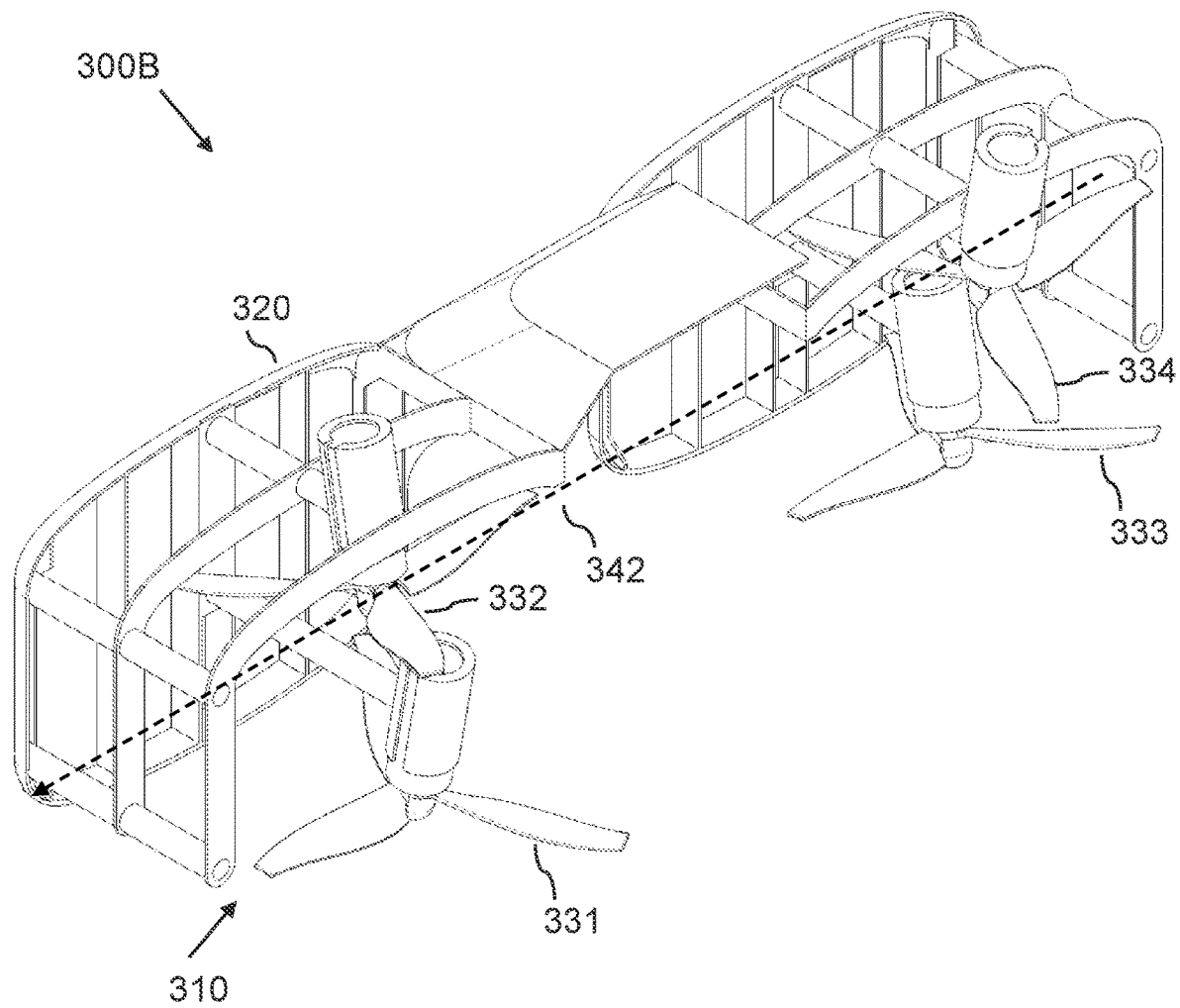
FIG. 3B is a perspective view of a linear thruster aircraft, according to an embodiment of the invention.

In yet other various related embodiments, FIG. 3B shows a third simplified linear thruster aircraft 300B, which is a simplified variant of the linear thruster aircraft 100, wherein there is a lateral and vertical offset of the thrusters, wherein there is no elongated mounting nacelle 122, wherein each thruster 331, 332, 333, 334 of the first linear thruster arrangement 310 are connected to the airframe 320, such that all the thrusters are positioned linearly substantially along (i.e. along but with lateral and vertical offsets) an elongated axis 342 of the third simplified linear thruster aircraft 300B.

In various related embodiments, the linear thruster aircraft 100 can include use of redundant propulsion, including using multiple motors on one shaft and motors that have internal redundant coils, which for example can include using two motors and two props that are working together to create a pair of co-rotating propellers which work together as one.

FIGS. 5 and 6 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 5 and 6 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the aircraft control unit 242 are to be interpreted in the most general manner.

For example, the processor 1802 can include a single physical microprocessor or microcontroller, a cluster of processors, a datacenter or a cluster of datacenters, a computing cloud service, and the like.

In a further example, the non-transitory memory 1804 can include various forms of non-transitory storage media, including random access memory and other forms of dynamic storage, and hard disks, hard disk clusters, cloud storage services, and other forms of long-term storage. Similarly, the input/output 1806 can include a plurality of well-known input/output devices, such as screens, keyboards, pointing devices, motion trackers, communication ports, and so forth.

Furthermore, it shall be understood that the aircraft control unit 242 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the linear thruster aircraft 100 device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A linear thruster aircraft, comprising:
   a) at least one linear thruster arrangement, comprising:
      a first thruster;
      a second thruster;
      a third thruster; and
      a fourth thruster; and
   b) an airframe;
   wherein each thruster of the at least one linear thruster arrangement is connected to the airframe at least substantially along an elongated axis of the airframe;
   wherein the first and second thrusters are positioned on a front side of a center of mass of the linear thruster aircraft; wherein the third and fourth thrusters are positioned on a rear side of the center of mass of the linear thruster aircraft;
   wherein the first and second thrusters comprise at least one thruster configured to provide a rightward downward thrust with respect to the elongated axis and at least one thruster configured to provide a leftward downward thrust with respect to the elongated axis; and
   wherein the third and fourth thrusters comprise at least one thruster configured to provide a rightward downward thrust with respect to the elongated axis and at least one thruster configured to provide a leftward downward thrust with respect to the elongated axis;
   such that the at least one linear thruster arrangement is configured to provide lift, pitch, roll, and yaw for the linear thruster aircraft by independently controlling a differential thrust for each of the first, second, third, and fourth thrusters;
   wherein each thruster of the first, second, third, and fourth thrusters are configured with alternating first and second side lateral offsets from the elongated axis;
   wherein each thruster of the first, second, third, and fourth thrusters are configured with alternating first and second side vertical offsets from the elongated axis;
   wherein the first thruster and the second thruster are at least partially vertically overlapping; and the third thruster and the fourth thruster are at least partially vertically overlapping;
   wherein the first thruster and the fourth thruster are configured with:
      uniform first sideward downward thrusts, each with an identical first side lateral angle;
      opposing respective bottom and top vertical offsets, which are each of an identical absolute length; and
      uniform second side lateral offsets, which are each of an identical length; and wherein the second thruster and the third thruster are configured with:
      uniform second sideward downward thrusts, each with an identical second side lateral angle;
      such that absolute values of first side lateral angles of the first thruster and the fourth thruster are identical to absolute values of second side lateral angles of the second thruster and the third thruster;
      opposing respective top and bottom vertical offsets, which are each of an identical absolute length;
      such that absolute values of the opposing respective bottom and top vertical offsets of the first thruster and the fourth thruster are identical to absolute values of the opposing respective top and bottom vertical offsets of the second thruster and the third thruster; and
      uniform first side lateral offsets, which are each of an identical length;
   such that absolute values of the uniform second side lateral offsets of the first thruster and the fourth thruster are identical to absolute values of the uniform first side lateral offsets of the second thruster and the third thruster.

2. The linear thruster aircraft of claim 1, wherein the airframe further comprises:
   an elongated mounting nacelle, wherein each thruster of the at least one linear thruster arrangement is connected to the elongated mounting nacelle at least substantially along an elongated axis of the elongated mounting nacelle.

3. The linear thruster aircraft of claim 2, wherein the airframe further comprises:
   a main body, which is rotatably connected to the elongated mounting nacelle with a rotatable connection.

4. The linear thruster aircraft of claim 3, wherein the rotatable connection is lockable, such that the main body is lockably rotatably connected to the elongated mounting nacelle; and wherein the elongated mounting nacelle is locked in position in a longitudinal orientation relative to the main body, such that a center axis of the elongated mounting nacelle is parallel to a center axis of the main body.

5. The linear thruster aircraft of claim 3, wherein the rotatable connection is lockable, such that the main body is lockably rotatably connected to the elongated mounting nacelle; and wherein the elongated mounting nacelle is locked in position in a lateral orientation relative to the main body, such that a center axis of the elongated mounting nacelle is perpendicular to a center axis of the main body.

6. The linear thruster aircraft of claim 5, further comprising an aircraft control unit, which is mounted in the airframe, wherein the aircraft control unit is configured to independently control a specific power applied for each thruster in the at least one linear thruster arrangement; and
   wherein the aircraft control unit is configured to control the rotatable connection, such that the aircraft control unit is configured to lock the rotatable connection, and such that the aircraft control unit is configured to release the rotatable connection.

7. The linear thruster aircraft of claim 1, wherein each thruster of the at least one linear thruster arrangement is a rotor.

8. The linear thruster aircraft of claim 1, wherein a center of thrust forces of the at least one linear thruster arrangement is vertically displaced from the center of mass of the linear thruster aircraft.

9. The linear thruster aircraft of claim 1, wherein the at least one linear thruster arrangement is vertically displaced from the center of mass of the linear thruster aircraft.

10. The linear thruster aircraft of claim 1, wherein the at least one linear thruster arrangement is positioned below the center of mass of the linear thruster aircraft, such that the at least one linear thruster arrangement lifts the linear thruster aircraft from a bottom of the linear thruster aircraft.

11. The linear thruster aircraft of claim 1, wherein the at least one linear thruster arrangement is positioned above the center of mass of the linear thruster aircraft, such that the at least one linear thruster arrangement lifts the linear thruster aircraft from a top of the linear thruster aircraft.

12. The linear thruster aircraft of claim 11, wherein the first and fourth thrusters are configured with a rightward downward thrust with respect to the elongated axis; and wherein the second and third thrusters are configured with a leftward downward thrust with respect to the elongated axis; such that:

the first and second thrusters are configured to provide a positive pitch of the linear thruster aircraft, when a first increased differential thrust is applied to the first and second thrusters;

the third and fourth thrusters are configured to provide a negative pitch of the linear thruster aircraft, when a second increased differential thrust is applied to the third and fourth thrusters;

the second and third thrusters are configured to provide a right roll of the linear thruster aircraft, when a third increased differential thrust is applied to the second and third thrusters;

the first and fourth thrusters are configured to provide a left roll of the linear thruster aircraft, when a fourth increased differential thrust is applied to the first and fourth thrusters;

the second and fourth thrusters are configured to provide a right yaw of the linear thruster aircraft, when a fifth increased differential thrust is applied to the second and fourth thrusters; and the first and third thrusters are configured to provide a left yaw of the linear thruster aircraft, when a sixth increased differential thrust is applied to the first and third thrusters.

13. The linear thruster aircraft of claim 11, wherein the first and fourth thrusters are configured with a first sideward downward thrust with respect to the elongated axis, and the second and third thrusters are configured with a second sideward downward thrust with respect to the elongated axis; such that:

the first and second thrusters are configured to provide a positive pitch of the linear thruster aircraft, when a first increased differential thrust is applied to the first and second thrusters;

the third and fourth thrusters are configured to provide a negative pitch of the linear thruster aircraft, when a second increased differential thrust is applied to the third and fourth thrusters;

the second and third thrusters are configured to provide a first side roll of the linear thruster aircraft, when a third increased differential thrust is applied to the second and third thrusters;

the first and fourth thrusters are configured to provide a second side roll of the linear thruster aircraft, when a fourth increased differential thrust is applied to the first and fourth thrusters;

the second and fourth thrusters are configured to provide a first side yaw of the linear thruster aircraft, when a fifth increased differential thrust is applied to the second and fourth thrusters; and the first and third thrusters are configured to provide a second side yaw of the linear thruster aircraft, when a sixth increased differential thrust is applied to the first and third thrusters.

14. The linear thruster aircraft of claim 13, wherein the first and fourth thrusters are configured with a leftward tilt, and the second and third thrusters are configured with a rightward tilt.

15. The linear thruster aircraft of claim 1, further comprising an aircraft control unit, which is mounted in the airframe, wherein the aircraft control unit is configured to independently control a specific power applied for each thruster in the at least one linear thruster arrangement.

16. The linear thruster aircraft of claim 15, wherein the aircraft control unit further comprises:
a) a processor;
b) a non-transitory memory;
c) an input/output component; and
d) a power manager, which is configured to control the specific power applied for each thruster in the at least one linear thruster arrangement; all connected via
e) a data bus.

17. A linear thruster aircraft, comprising:
at least one linear thruster arrangement, comprising:
a first plurality of at least two thrusters, which are positioned to a first side of a center of mass of the linear thruster aircraft; and
a second plurality of at least two thrusters, which are positioned to a second side of the center of mass of the linear thruster aircraft;
wherein the first plurality of at least two thrusters comprises at least one thruster configured to provide a first sideward downward thrust and at least one thruster configured to provide a second sideward downward thrust; and
wherein the second plurality of at least two thrusters comprises at least one thruster configured to provide a first sideward downward thrust and at least one thruster configured to provide a second sideward downward thrust;
an elongated mounting nacelle, wherein each thruster of the at least one linear thruster arrangement is connected to the elongated mounting nacelle at least substantially along an elongated axis of the elongated mounting nacelle; and
a main body, which is rotatably connected to the elongated mounting nacelle with a rotatable connection.

18. The linear thruster aircraft of claim 17, wherein each thruster of the at least one linear thruster arrangement is positioned at least substantially along an elongated axis of the linear thruster aircraft.

19. The linear thruster aircraft of claim 18, wherein the first plurality of at least two thrusters comprises first and second thrusters, and the second plurality of at least two thrusters comprises third and fourth thrusters;
wherein the first and fourth thrusters are configured with a first sideward downward thrust with respect to the elongated axis, and the second and third thrusters are configured with a second sideward downward thrust with respect to the elongated axis.

20. A linear thruster aircraft, comprising:
at least one linear thruster arrangement, comprising:
a first thruster;
a second thruster;
a third thruster; and
a fourth thruster;
wherein each thruster of the at least one linear thruster arrangement is positioned at least substantially along an elongated axis of the linear thruster aircraft;
such that the first, second, third, and fourth thrusters are configured with alternating first and second side lateral offsets from the elongated axis;
wherein each thruster of the first, second, third, and fourth thrusters are configured with alternating first and second side lateral offsets from the elongated axis;
wherein each thruster of the first, second, third, and fourth thrusters are configured with alternating first and second side vertical offsets from the elongated axis;
wherein the first thruster and the second thruster are at least partially vertically overlapping; and the third thruster and the fourth thruster are at least partially vertically overlapping;
wherein the first thruster and the fourth thruster are configured with:

uniform first sideward downward thrusts, each with an identical first side lateral angle;

opposing respective bottom and top vertical offsets, which are each of an identical absolute length; and uniform second side lateral offsets, which are each of an identical length; and wherein the second thruster and the third thruster are configured with:

uniform second sideward downward thrusts, each with an identical second side lateral angle;

such that absolute values of first side lateral angles of the first thruster and the fourth thruster are identical to absolute values of second side lateral angles of the second thruster and the third thruster;

opposing respective top and bottom vertical offsets, which are each of an identical absolute length;

such that absolute values of the opposing respective bottom and top vertical offsets of the first thruster and the fourth thruster are identical to absolute values of the opposing respective top and bottom vertical offsets of the second thruster and the third thruster; and uniform first side lateral offsets, which are each of an identical length;

such that absolute values of the uniform second side lateral offsets of the first thruster and the fourth thruster are identical to absolute values of the uniform first side lateral offsets of the second thruster and the third thruster.

21. The linear thruster aircraft of claim 20, wherein the first and fourth thrusters are configured with a first sideward downward thrust with respect to the elongated axis; and the second and third thrusters are configured with a second sideward downward thrust with respect to the elongated axis.

* * * * *